United States Patent Office 2,794,797
Patented June 4, 1957

2,794,797

METALLISABLE AZO DYESTUFFS

Robert Ronald Davies, Manchester, and Alexander Robertus Todd, Cambridge, England, assignors to Imperial Chemical Industries Limited, London, England, a corporation of Great Britain No Drawing. Application September 6, 1955, Serial No. 532,761

Claims priority, application Great Britain September 10, 1954

10 Claims. (Cl. 260—155)

This invention relates to metallisable azo dyestuffs and more particularly it relates to metallisable azo dyestuffs derived from heterocyclic compounds containing hydroxyl groups.

It has been proposed in co-pending U. S. application Serial No. 464,595 to manufacture metallisable azo dyestuffs by sulphating compounds containing the group

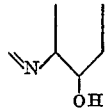

wherein the nitrogen atom is part of a heterocyclic ring.

We have now found that valuable metallisable azo dyestuffs may be obtained by phosphating compounds containing the said group.

Thus, according to the invention we provide new azo dystuffs characterised in that they contain at least once the group

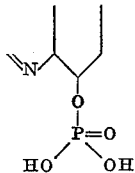

wherein the nitrogen atom is part of a heterocyclic ring.

According to a further feature of the invention we provide a process for the manufacture of the said new azo dyestuffs which comprises phosphating compounds containing the group:

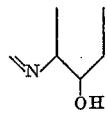

wherein the nitrogen atom is part of a heterocyclic ring.

The starting materials for use in the said process are obtainable for example by coupling a diazotised primary aromatic amine, for example a tetrazotised aromatic diamine, with a coupling component containing the stated group. Such coupling components include for example 8-hydroxyquinoline, 1-hydroxyacridine, 4-hydroxybenzthiazole and substituted 4-hydroxybenzthiazoles.

As primary aromatic amines which may be diazotized and coupled with the coupling components there are particularly to be mentioned certain diamines, for example benzidine, dianisidine, 4:4'-diaminoazobenzene, 4:4'-diaminobenzanilide, 3':4 - diamino-3:4'-dimethoxybenzanilide, 4:4'-diaminodiphenylamine, 1:5-diaminonaphthalene and 4:4'-diaminodiphenylurea. The diazotisation of the primary aromatic amine and the coupling of it with the appropriate coupling component may be carried out according to known procedures. The starting materials may also be obtained by processes comprising the linking together of azo dyestuffs with one another or with suitable compounds, provided always that the compounds are so selected that the final starting material contains at least once the stated group.

The phosphation of the said starting material is brought about by treatment of the starting materials with phosphating agents. The phosphating agent which is particularly suitable for this purpose is phosphorus pentoxide in combination with a tertiary amine, for example pyridine or triethylamine, with or without the presence of a solvent for example ethylene dichloride.

The new dyestuffs of the invention are more readily soluble in water than the corresponding sulphated derivatives, and are particularly useful for the dyeing of cellulosic fibres and fabrics and other fibres and fabrics for example those made from or containing nylon and other polyamide and polyester fibres and/or from cellulose acetate, by the known after-coppering process.

For use in this process, a preferred class of dyestuffs are those wherein there is no solubilising group save the PO₃H₂ group in the group

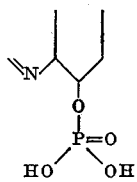

The said PO₃H₂ group is removed in the process of after-coppering with the result that the coppered dyestuff is fixed firmly in the fibre as an insoluble substance. The after-coppered dyeings possess a high degree of fastness to washing, without the use of dye-fixing agents, and to light, in the same way as those derived from the corresponding sulphated dyestuffs described in co-pending U. S. application Serial No. 464,595.

One preferred class of dyestuffs of this invention is that obtained by phosphation of the product obtained by coupling a tetrazotised diamine of the formula

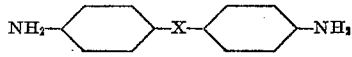

wherein X may stand for a direct linkage or for a bridging group for example —N=N—, —CONH—, NH or —NH—CO—NH— and wherein the aromatic nuclei may be further substituted by for example alkoxy groups, with for example two molecular proportions of 8-hydroxyquinoline.

The invention is illustrated but not limited by the following examples in which the parts are by weight.

*Example 1*

2 parts of the compound obtained by coupling one molecular proportion of tetrazotised 4:4'-diamino-3:3'-dimethoxydiphenyl with two molecular proportions of 8-hydroxyquinoline are suspended in 5 parts of pyridine. 3.5 parts of phosphorus pentoxide are added and the mixture is heated to 110° for 1 hour. The mixture is then poured into a mixture of 75 parts of 2N aqueous sodium carbonate solution and 100 parts of water. The mixture is filtered at 90° C. and the filtrate is salted to 20% w./v. with common salt. The precipitate is filtered off at 20° C., pasted with 0.1 part of dextrin and dried. The product is completely soluble in water to give an orange-brown solution which dyes cellulosic fibres by the normal acidic after-coppering process in rubine shades of excellent wash fastness and good light fastness.

*Example 2*

2 parts of the compound obtained by coupling one molecular proportion of 4:4'-diamino-1:1'-azobenzene with two molecular proportions of 8-hydroxyquinoline are mixed with 5 parts of pyridine and phosphated in the manner described in Example 1. The phosphated product is isolated in the manner described in Example 1. The resulting dyestuff, when applied to cellulosic fibres by the acidic after-coppering process, gives violet shades of excellent fastness to washing and of good light fastness.

*Example 3*

Proceeding in a manner similar to that described in Example 2 the compound obtained by coupling one molecular proportion of tetrazotised 3:3'-diaminobenzanilide with two molecular proportions of 8-hydroxyquinoline is phosphated to give a dyestuff which dyes cellulosic fibres by the acidic after-coppering process to give yellowish-orange shades of excellent wash fastness and good light fastness.

What we claim is:

1. A metallizable azo dyestuff characterized in that it contains at least once the group

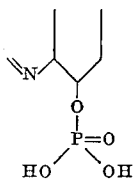

wherein the nitrogen atom is part of a heterocyclic ring, there being no solubilizing group save the PO₃H₂ group in the group:

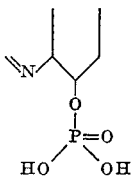

2. A metallizable azo dyestuff according to claim 1 wherein said dyestuff is obtained by phosphating the compound obtained by coupling a tetrazotized diamine of the formula

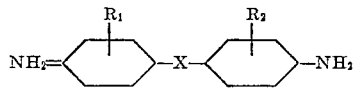

wherein R₁ and R₂ stand for a member of the group consisting of hydrogen and lower alkoxy and X stands for a member of the group consisting of a direct linkage, —N=N—, —CONH—, —NH—, and

—NH—CO—NH— with 8-hydroxyquinoline.

3. A metallizable azo dyestuff according to claim 1 wherein said dyestuff is obtained by phosphating the compound obtained by coupling a tetrazotized diamine of the formula

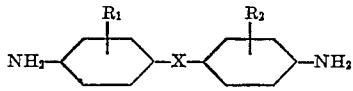

wherein R₁ and R₂ stand for a member of the group consisting of hydrogen and lower alkoxy and X stands for a member of the group consisting of a direct linkage, —N=N—, —CONH—, —NH—, and

—NH—CO—NH— with 8-hydroxyquinoline, the phosphating agent comprising phosphorous pentoxide in combination with a tertiary amine.

4. A metallizable azo dyestuff according to claim 2 wherein said compound is obtained by coupling tetrazotized 4:4'-diamino-3:3'-dimethoxy-diphenyl with 2 molecular proportions of 8-hydroxyquinoline and said compound is phosphated with a phosphating agent comprising phosphorous pentoxide in combination with a tertiary amine.

5. A metallizable azo dyestuff according to claim 2 wherein said compound is obtained by coupling tetrazotized 4:4'-diamino-1:1'-azobenzene with 2 molecular proportions of 8-hydroxyquinoline and said compound is phosphated with a phosphating agent comprising phosphorous pentoxide in combination with a tertiary amine.

6. A metallizable azo dyestuff according to claim 2 wherein said compound is obtained by coupling tetrazotized 3:3'-diamino-benzanilide with 2 molecular proportions of 8-hydroxyquinoline and said compound is phosphataed with a phosphating agent comprising phosphorous pentoxide in combination with a tertiary amine.

7. A process for manufacturing an azo dyestuff as defined in claim 1 which comprises phosphating a compound containing the group

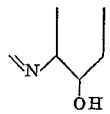

wherein the nitrogen atom is part of a heterocyclic ring, with a phosphating agent comprising phosphorous pentoxide in combination with a tertiary amine.

8. The process of claim 7 wherein the compound which is phosphated is obtained by coupling a diazotized primary aromatic amine with a coupling component containing said

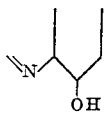

group.

9. The process of claim 8 wherein said coupling component is selected from the group consisting of 8-hydroxyquinoline; 1-hydroxyacridine; and 4-hydroxybenzthiazoles.

10. The process of claim 8 wherein said diazotized primary aromatic amine is selected from the group consisting of tetrazotized 4:4'-diamino-3:3'dimethoxydiphenyl, 4:4'-diamino-1:1'-azobenzene and 3:3'-diaminobenzanilide.

References Cited in the file of this patent

UNITED STATES PATENTS

| 2,227,963 | Dickey et al. | Jan. 7, 1941 |
| 2,245,261 | Dickey et al. | June 10, 1941 |
| 2,396,327 | Kvalnes et al. | Mar. 12, 1946 |

FOREIGN PATENTS

| 1,001,253 | France | Oct. 24, 1951 |

OTHER REFERENCES

Shreve et al.: "Studies in Azo Dyes," Jour. Amer. Chem. Soc., vol. 65, November 1943, pgs. 2243-2244.